United States Patent
Koshoffer et al.

(10) Patent No.: US 7,251,941 B2
(45) Date of Patent: Aug. 7, 2007

(54) ABLATIVE AFTERBURNER

(75) Inventors: John Michael Koshoffer, Cincinnati, OH (US); Randy Lee Lewis, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 636 days.

(21) Appl. No.: 10/797,212

(22) Filed: Mar. 10, 2004

(65) Prior Publication Data

US 2005/0198940 A1  Sep. 15, 2005

(51) Int. Cl.
*F02K 3/11* (2006.01)

(52) U.S. Cl. .................... 60/766; 239/265.15

(58) Field of Classification Search ............. 60/204, 60/761, 762, 763, 764, 765, 766; 239/265.11, 239/265.15
See application file for complete search history.

(56) References Cited

U.S. PATENT DOCUMENTS

| | | | |
|---|---|---|---|
| 2,693,083 A | 11/1954 | Abbott | |
| 2,780,916 A | 2/1957 | Collins | |
| 2,799,991 A | 7/1957 | Conrad | |
| 2,872,785 A | 2/1959 | Barrett et al. | |
| 2,920,445 A | 1/1960 | Bailey | |
| 3,054,259 A | 9/1962 | Arthur et al. | |
| 3,176,465 A | 4/1965 | Colley | |
| 3,253,403 A | 5/1966 | Hayes | |
| 3,309,874 A | 3/1967 | Gould | |
| 3,437,173 A | 4/1969 | Ehrich | |
| 4,064,691 A | 12/1977 | Nash | |
| 4,242,865 A | 1/1981 | Harrison et al. | |
| 4,384,454 A * | 5/1983 | Engl | 239/265.15 |
| 5,020,318 A | 6/1991 | Vdoviak | |
| 5,082,182 A | 1/1992 | Bruchez et al. | |
| 6,125,627 A | 10/2000 | Rice et al. | |
| 2004/0081783 A1 * | 4/2004 | Prince | 428/36.9 |

FOREIGN PATENT DOCUMENTS

DE  1061134  7/1959

OTHER PUBLICATIONS

Williams Reasearch Corporation, "F107 Cruise Missile Engines, F107-WR-102 Cross Section," Published in USA before Dec. 2002.

* cited by examiner

*Primary Examiner*—L. J. Casaregola
(74) *Attorney, Agent, or Firm*—William S. Andes; Francis L. Conte

(57) ABSTRACT

An afterburner includes an exhaust duct with a fixed area outer nozzle at an aft end thereof, and an ablative inner nozzle therein. The smaller inner nozzle is consumed during reheat operation to expose the larger outer nozzle for increased propulsion thrust.

25 Claims, 3 Drawing Sheets

ABLATIVE AFTERBURNER

BACKGROUND OF THE INVENTION

The present invention relates generally to gas turbine engines, and, more specifically, to augmented engines.

Gas turbine engines are available in a variety of configurations, sizes, and output thrust. The typical turbofan engine includes in serial flow communication a fan, multistage compressor, combustor, high pressure turbine (HPT), and low pressure turbine (LPT). The HPT is joined to the compressor by one shaft, and the LPT is joined to the fan by another shaft.

In operation, air enters the engine and flows past the fan and into the compressor wherein it is pressurized and discharged to the combustor. Fuel is added to the compressed air in the combustor for generating hot combustion gases which are discharged through the turbine stages.

The HPT includes rotor blades which extract energy from the combustion gases for rotating the supporting disk joined to the shaft which powers the compressor. The combustion gases then flow to the LPT which includes additional turbine blades which extract additional energy from the gases for rotating the supporting rotor disk which powers the shaft to drive the upstream fan.

An annular bypass duct typically surrounds the core engine for bypassing a portion of the air pressurized by the fan for producing propulsion thrust independently from the core exhaust gases discharged from the core engine through the LPT.

The engine has a surrounding nacelle which may be relatively short for defining a separate fan exhaust nozzle located upstream from the exhaust nozzle for the core engine. The nacelle may also be long extending downstream to a common engine outlet through which both the fan bypass air and the core exhaust gases are discharged collectively for producing the propulsion thrust.

Gas turbine engines are highly sophisticated and complex and include many individual parts which must be separately manufactured and assembled in the final engine. The number of parts required in a particular engine directly affects the complexity thereof and the associated manufacturing cost.

Cost is always a primary consideration in manufacturing gas turbine engines. And, cost is particularly significant in manufacturing gas turbine engines for expendable applications, or for a limited number of uses. For example, the typical military cruise missile includes a small turbofan engine which is specifically configured for the one-time use of the missile which, of course, is destroyed upon reaching its target.

Furthermore, small, pilotless drones or remotely piloted vehicles may also benefit from the use of small turbofan engines for a limited number of flight missions.

The small turbofan engines used in these limited-mission applications are specifically configured for subsonic operation at less than the speed of sound. However, for applications requiring supersonic operation at greater than the speed of sound, the engines require additional propulsion thrust.

Such additional thrust is typically provided by introducing an afterburner or augmentor at the discharge end of the turbofan engine for burning additional fuel and generating additional propulsion thrust when desired. The typical afterburner is a complex assembly of many parts including flameholders, fuel injectors, a combustion liner, and a variable area exhaust nozzle.

The exhaust nozzle is particularly complex since it must be configured for operation in a dry mode for normal operation of the basic turbofan engine, as well as during a wet or reheat mode of operation when additional fuel is burned in the afterburner.

The variable area nozzle must have a specific axial profile which converges to a throat of minimum area and then diverges to the outlet of the nozzle in a commonly configured converging-diverging (C-D) nozzle.

The throat of the nozzle provides a minimum discharge flow area for dry operation of the engine. When the afterburner is activated additional fuel is consumed, which in turn requires a larger discharge throat area, as well as a suitable C-D nozzle profile for achieving supersonic exhaust velocity from the nozzle. The larger exhaust area during wet operation is required to prevent excessive back pressure on the core engine and, in particular the compressor thereof, to avoid undesirable compressor stall.

The C-D variable area nozzle is therefore substantially complex and requires individual exhaust flaps joined together to create the articulated C-D nozzle profile which may be varied between the dry and wet modes of operation. Suitable actuators and seals are also required to ensure proper performance of the nozzle and engine over a suitable life span.

In view of the complexity of the typical C-D nozzle, the introduction thereof in the relatively small expendable or limited use aircraft applications described above is not practical, if even possible.

Accordingly, it is desired to provide an expendable or limited use gas turbine engine with a simplified afterburner for achieving supersonic flight operation.

BRIEF DESCRIPTION OF THE INVENTION

An afterburner includes an exhaust duct with a fixed area outer nozzle at an aft end thereof. An ablative inner nozzle is disposed inside the outer nozzle, and is consumed during reheat operation to increase exhaust area.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
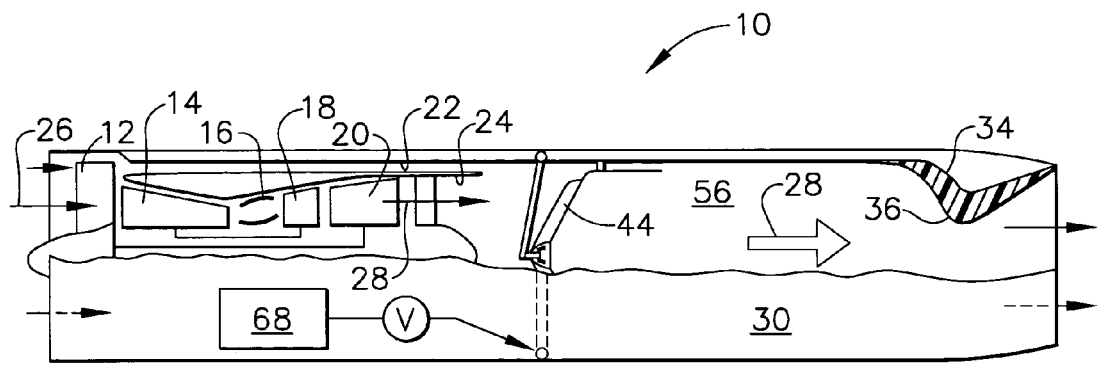
FIG. 1 is a schematic, axial sectional view through a turbofan gas turbine engine having an afterburner.

Illustrated schematically in FIG. 1 is an augmented turbofan gas turbine engine 10 configured for powering an aircraft in flight. The engine is specifically configured for powering an expendable single-use aircraft, such as a cruise missile, or a limited-use aircraft such as a remotely piloted drone aircraft, for example.

The engine is axisymmetrical about a longitudinal or axial centerline axis and includes in serial flow communication a fan 12, multistage compressor 14, combustor 16, high pressure turbine (HPT) 18, and low pressure turbine (LPT) 20. Each of the turbines includes corresponding turbine nozzles and rows of turbine rotor blades.

The rotor blades of the HPT 18 are supported from a rotor disk joined by one shaft to the corresponding rotors of the multistage compressor 14. The turbine blades of the LPT 20 are supported by another rotor disk which in turn is joined to the fan 12 by another shaft extending axially therebetween.

Surrounding the core engine and LPT is an annular bypass duct 22 having an annular outlet surrounding an outlet 24 for the core engine. The outlet 24 is defined at the turbine rear frame which includes a row of outlet guide vanes extending radially inwardly from the bypass duct and terminating at a central plug or centerbody.

During operation, air 26 enters the front inlet of the engine and is channeled through the compressor 14 for pressurization therein. In the combustor 16, fuel is added to the pressurized air and ignited for generating hot combustion gases 28 which are discharged through the several turbine stages that extract energy therefrom for powering the fan and compressor. A portion of the fan air bypasses the core engine and flows through the bypass duct 22 for discharge around the core exhaust gases 28 discharged through the outlet 24.

The basic turbofan engine 10 itself may have any conventional configuration and operates in a conventional manner for producing propulsion thrust in the discharged fan bypass air and core exhaust gases. However, the engine further includes an augmentor or afterburner 30 specifically configured for introducing additional thrust in the aircraft when desired by burning additional fuel therein.

Figure 2:
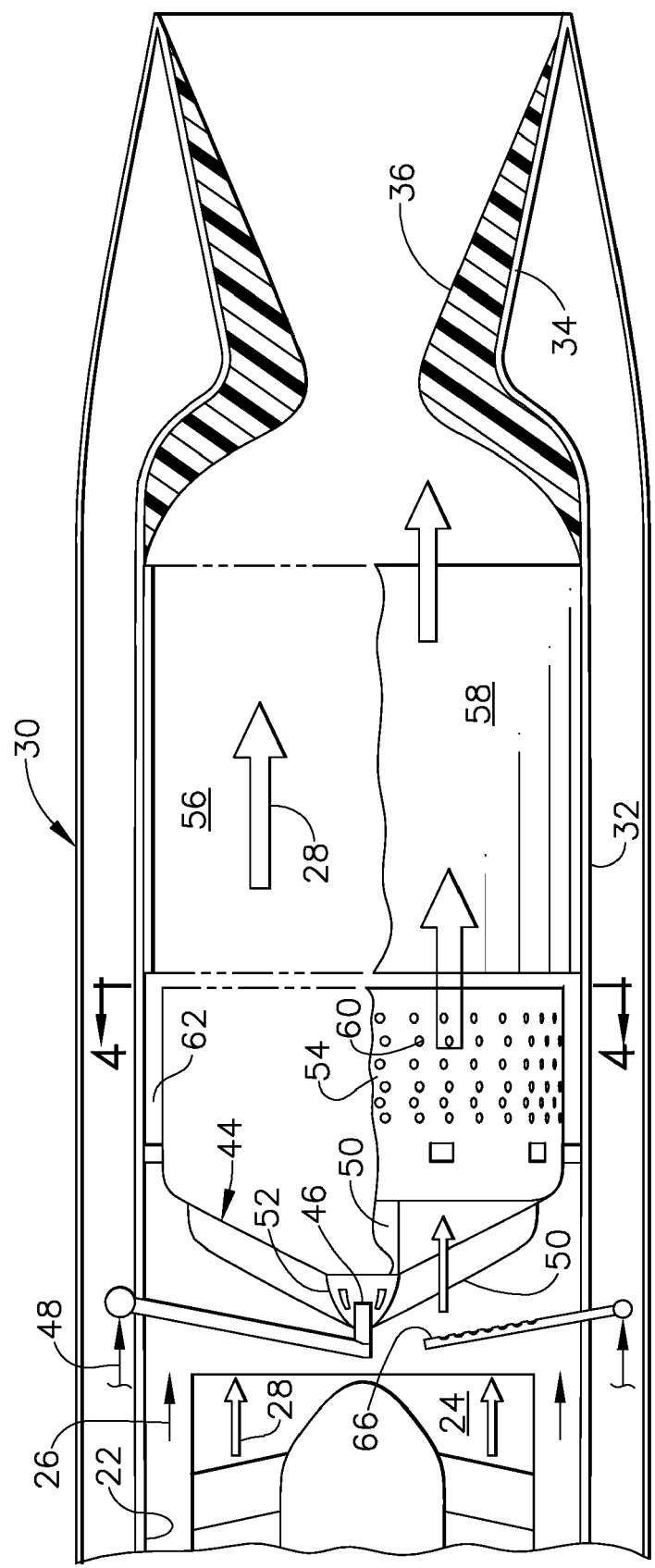
FIG. 2 is an enlarged axial sectional view of the afterburner in the engine illustrated in FIG. 1.

The afterburner 30 is illustrated in more detail in FIG. 2. In this exemplary embodiment, the afterburner includes an annular tailpipe or exhaust duct 32 disposed inside the surrounding nacelle of the engine. The exhaust duct includes a fixed area outer nozzle 34 at the aft end thereof, and an ablative inner nozzle 36 lining or covering the inner surface of the outer nozzle 34. In order to simplify the construction of the afterburner, the outer nozzle 34 has no moving parts, and is non-variable in flow area itself, but instead has a specific and non-variable configuration.

In contrast, the inner nozzle 36 is formed of a suitable material having ablative properties so that it ablates during operation and is consumed to leave behind the outer nozzle 34. The outer nozzle may be formed of any suitable material such as sheet metal or composite fibers in a supporting matrix for withstanding the hostile environment of the augmentor for the limited time required during operation.

Figure 3:
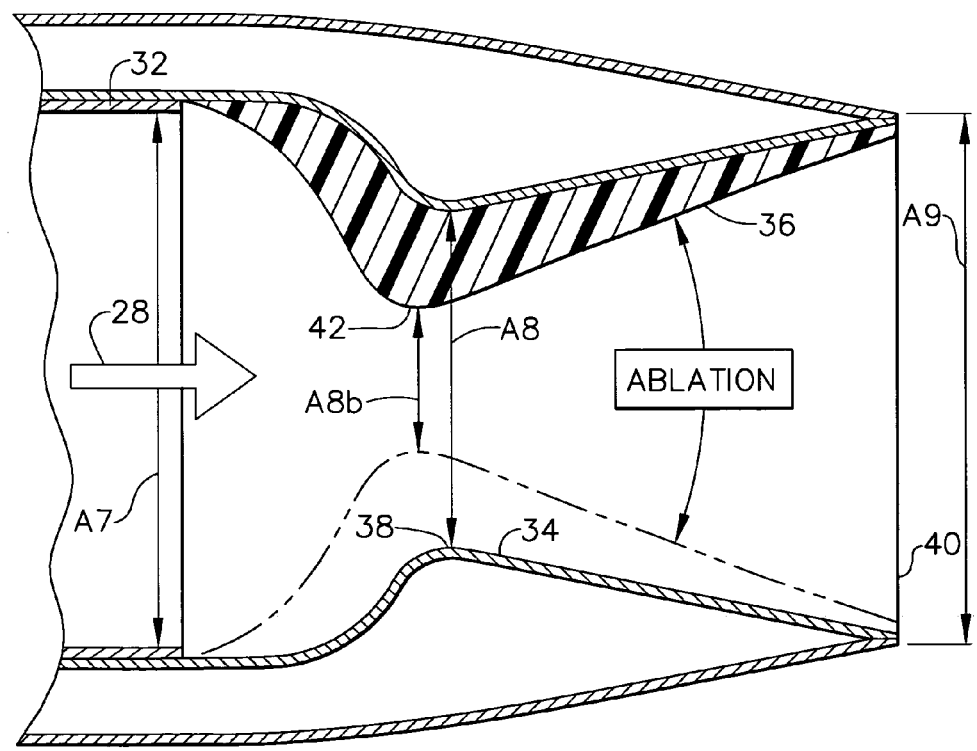
FIG. 3 is an enlarged axial sectional view of the afterburner exhaust nozzle illustrated in FIG. 2.

As shown in more detail in FIG. 3, the outer nozzle 34 has an axial contour or profile which converges aft to an outer throat 38 of minimum flow area, and then diverges aft from the throat to a common nozzle outlet 40 located at the aft end of the outer nozzle.

Similarly, the inner nozzle 36 has an axial contour or profile which converges aft to an inner throat 42 of minimum flow area for the inner nozzle, which area is smaller than that of the outer throat. From the inner throat 42, the inner nozzle then diverges aft to the common nozzle outlet 40.

For comparison purposes, the top portion of the inner nozzle 36 is illustrated complete in FIG. 3 in the initial dry mode configuration, and the bottom portion thereof is shown consumed in phantom line outline in the subsequent wet mode configuration following the ablation process.

The specific axial contours of the two nozzles 34,36 may match those of the typical variable area exhaust nozzles found in conventional augmented engines for maximizing performance of the engine during dry operation of the engine when additional fuel is not introduced in the afterburner, and during wet or reheat operation of the engine when additional fuel is burned in the afterburner for producing additional thrust.

The afterburner may therefore be specifically configured for increasing the thrust output of the engine for propelling the aircraft to supersonic velocity greater than Mach 1. To do so, the exhaust 28 discharged through the exhaust nozzle must achieve supersonic velocity which is effected by the controlled convergence and divergence of the exhaust nozzle.

In particular, the nominal flow area of the exhaust duct 32 just upstream of the exhaust nozzle is typically designated A7. The outer nozzle 34 then converges to its throat 38 of minimum flow area, designated A8. And from this throat of minimum area, the outer nozzle diverges to the outlet 40 which has a relatively large area designated A9. The precise contour of the C-D outer nozzle 34 may be conventionally determined for effecting efficient supersonic flow of the exhaust gases 28 discharged through the nozzle during wet operation.

Correspondingly, the inner nozzle 36 decreases in flow area from the initial outlet area A7 of the duct to its smaller throat area A8*b* at the inner throat 42, and then diverges outwardly to the common outlet 40. The specific C-D profile of the inner nozzle 36 may also be conventionally determined for maximizing performance of the engine during dry operation when additional fuel is not introduced in the afterburner.

In the preferred embodiment illustrated in FIG. 3, the ablative inner nozzle 36 is formed of a suitable combustible material such as solid rocket fuel or propellant of conventional composition. In solid form, the combustible material may be suitably molded or formed to the desired C-D contour for controlling exhaust discharge through the nozzle during the dry mode of operation for the intended limited duration of the aircraft.

During dry operation, the temperature of the exhaust gases 28 are substantially lower than those found inside the combustor of the engine and are insufficient to significantly ablate the inner nozzle during the corresponding duration of dry operation.

However, during wet operation of the engine when additional fuel is introduced into the afterburner and ignited for generating hot combustion gases, those hot gases are then discharged through the combustible inner nozzle for controlled combustion thereof which then consumes the inner nozzle in a suitably short time as the afterburner kicks in.

Upon full consumption of the inner nozzle, the remaining C-D outer nozzle 34 is revealed or fully exposed, and provides both the increased throat area A8 and specific C-D contour for maximizing performance of the engine during afterburner operation with the attendant increased propulsion thrust therefrom.

Since the afterburner 30 illustrated in FIG. 2 is intended for limited use or expendable single-use operation of the engine, the afterburning portion thereof should also be simplified to complement the simplicity introduced into the nested nozzles 34, 36. For example, the afterburner includes an annular flameholder 44 suitably mounted inside the forward inlet end of the exhaust duct 32. A plurality of mounting brackets surround the flameholder and permit bolting thereof to the forward end of the exhaust duct in one example.

A fuel injector 46 extends from a supporting stem extending radially inwardly from the exhaust duct 32, and is disposed at the center of the flameholder for injecting additional fuel 48 therein when desired for wet operation of the engine. A conventional igniter (not shown) is suitably mounted in the flameholder for igniting the combustible mixture of the added fuel 48 and the exhaust gases 28 discharged from the core engine, which still retain sufficient oxygen for afterburner combustion.

Figure 4:
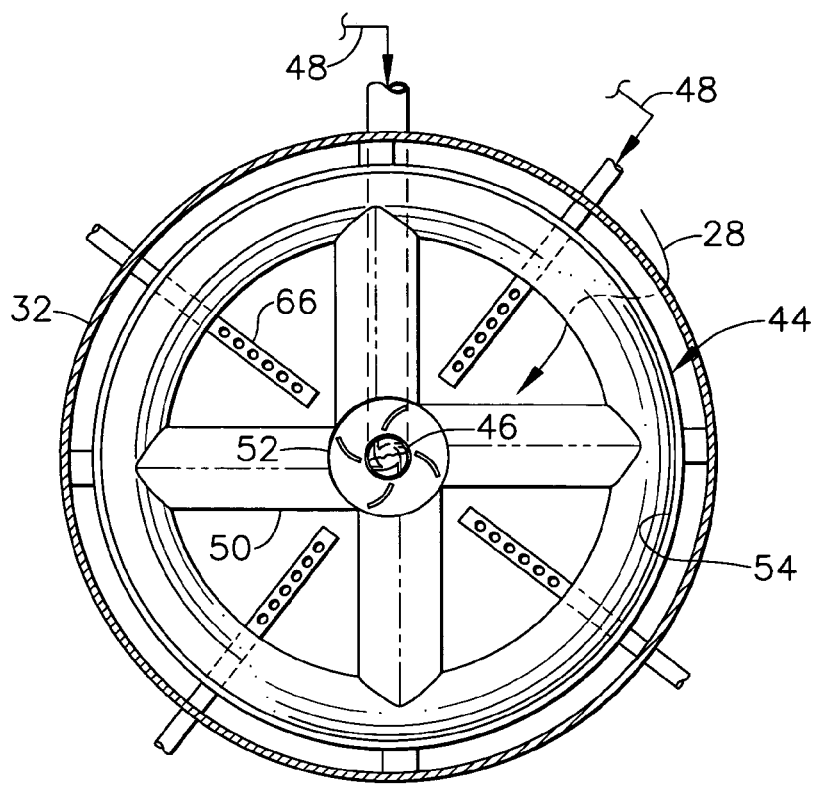
FIG. 4 is an aft-facing-forward radial sectional view of the flameholder illustrated in FIG. 2 and taken along line 4-4.

The flameholder 44 is illustrated in more detail in FIG. 4 and includes a plurality flameholding spokes or gutters 50 extending radially outwardly from a center swirl cup 52 to a surrounding cylindrical skirt or liner 54. The individual gutters 50 have generally V-shaped cross sections with the apex of the V facing upstream towards the core engine, with the V being open in the downstream direction for performing the typical flameholding function.

The fuel injector 46 is located in the center of the swirl cup 52 and injects fuel therein during wet operation to undergo combustion, with the combustion flames propagating radially outwardly along the four gutters illustrated. The combustion flame is contained inside the surrounding cylindrical combustion liner 54 which protects the surrounding exhaust duct 32 from the hot temperature thereof.

In order to further reduce the complexity of the afterburner, and associated cost, the liner 54 surrounding the flameholder preferably terminates upstream from the outer nozzle 34 to define an annular combustion chamber 56. The combustion chamber preferably extends in minor part inside the flameholder liner 54 and in major part downstream therefrom inside the exhaust duct to define a linerless portion thereof.

In order to protect the linerless portion of the exhaust duct 32 between the flameholder liner and the exhaust nozzles, a conventional thermal barrier coating 58 may completely cover the inner surface of the exhaust duct 32 at least in its linerless portion, as well as upstream and downstream therefrom as desired. Thermal barrier coatings are conventional in material composition and performance, and are typically ceramic materials providing enhanced thermal insulation protection from the hot combustion gases generated during wet operation of the afterburner.

Alternatively, low emissivity coatings may coat the inner surface of the exhaust duct for protection thereof, or conventional thin ablative coatings may also be used for providing the requisite amount of heat protection to the exhaust duct for its life.

The flameholder liner 54 illustrated in FIG. 2 not only protects the upstream portion of the exhaust duct in which the combustion process is initiated during wet operation, but may also include a suitable pattern of a multitude of screech suppression holes 60 therein. The holes 60 extend radially through the cylindrical liner 54 and may be used for suppressing screech in a conventional manner.

The flameholder liner 54 illustrated in FIG. 2 is preferably spaced radially inwardly from the upstream portion of the exhaust duct 32 to define an annular channel or slot 62 radially therebetween.

The outlet 24 of core engine is aligned with the flameholder 44 disposed immediately downstream therefrom for discharging the spent core exhaust 28 from the engine and into the afterburner. The surrounding fan bypass duct 22 is aligned with the flameholder liner 54 for discharging the fan bypass air 26 around that liner.

The slot 62 surrounding the liner 54 is open at the upstream end of the flameholder for receiving the fan bypass air 26 as cooling air for cooling the liner 54 itself. Furthermore, the fan air channeled outside the flameholder liner 54 is discharged from the outlet end of the slot 62 in a film of cooling air which flows downstream over the linerless duct portion for providing cooling thereof over the inner surface of the protective thermal barrier coating 58.

In the preferred embodiment illustrated in FIG. 4, the radial gutters 50 are integrally formed with the center cup 52 and surrounding liner 54 in a unitary or one-piece component for reducing cost of manufacture, while introducing additional simplicity in the design. The various sections of the flameholder may initially be formed in a flat sheet metal plate and cut to size and stamped to the corresponding shapes thereof. The sheet metal may be rolled into the annular configuration of the resulting flameholder and suitably welded or brazed together at the required joining lines.

Figure 5:
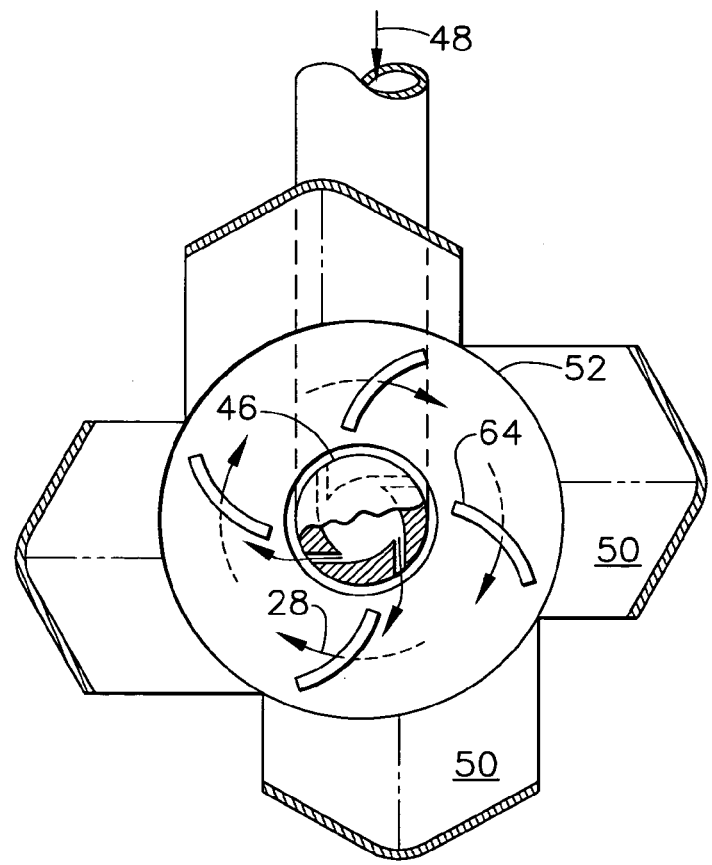
FIG. 5 is an enlarged elevational view of the center swirl cup and fuel injector illustrated in FIG. 4.

The swirl cup 52 is illustrated in more detail in FIG. 5 and includes a center aperture which receives the fuel injector 46 therein. A plurality of surrounding swirl slots 64 are circumferentially spaced apart around the perimeter of the cup 52. The swirl slots 64 face in the upstream direction toward the outlet of the core engine and receive therethrough the core exhaust gases 28 which exhaust gases are swirled by the slots inside the swirl cup 52.

The fuel injector 46 may have a suitably simple configuration including a plurality of tangentially oriented fuel outlets illustrated in FIG. 5 which inject the fuel 48 tangentially outwardly into the surrounding swirl cup 52 in either co-rotation with the swirling exhaust 28 (as shown), or in counter-rotation therewith (not shown). In this way, the additional fuel 48 introduced into the swirl cup 52 is thoroughly mixed with the exhaust gases 28 to create a combustible mixture which is then suitably ignited, with the flames therefrom propagating radially outwardly along the V-shaped gutters 50 to the perimeter of the flameholder inside the surrounding liner 54.

A plurality of conventional fuel injection spray bars 66 are preferably distributed circumferentially around the flameholder as illustrated in FIG. 4 in the open quadrants between the four flameholding gutters 50. The spray bars 66 are commonly joined with the center fuel injector 46 to a suitable source of fuel for controlled operation of the afterburner.

More specifically, the turbofan engine illustrated schematically in FIG. 1 further includes a computer or controller 68 which is operatively joined to the fuel injector and the additional spray bars, with a suitable control valve in the fuel lines thereto. The controller 68 controls all operations of the engine in a typical manner, and additionally controls operation of the afterburner. This is typically effected by suitable control algorithms or software in the controller.

The controller 68 may therefore be specifically configured to schedule fuel flow to the afterburner when desired for wet operation of the engine and obtaining additional thrust for supersonic operation of the intended aircraft.

Performance of the turbofan engine itself is affected by performance of the afterburner. Excess pressure, or backpressure, developed inside the afterburner can adversely affect performance of the turbofan engine, such as leading to undesirable stall of the compressor therein.

Accordingly, the controller 68 is specifically configured to schedule the fuel flow to the afterburner to match the rate of ablation of the consumable inner nozzle 36 upon initiation of afterburner operation. Since the inner nozzle 36 introduces the minimum initial throat flow area $A8b$, scheduling of the fuel to the afterburner must be controlled to match the increase in exhaust area of the nozzle as the inner nozzle is consumed during operation.

By matching the increasing throat area of the inner nozzle 36 as it is consumed during operation with operation of the turbofan engine itself, a suitable stall margin may be maintained in the compressor 14 for maximizing performance of the turbofan engine during augmentor operation. Only when the inner nozzle 36 is fully consumed leaving behind the fixed area outer nozzle 34, can maximum propulsion thrust be generated through the afterburner, and thusly the possibility of reducing stall margin in the compressor is substantially eliminated.

Accordingly, the simplified afterburner 30 may be used in conjunction with the otherwise conventional turbofan engine 10 for enhanced operation including increased propulsion thrust when desired. The turbofan engine 10 itself may be operated in its dry, subsonic mode of operation to produce exhaust thrust through the inner nozzle 36 without injecting fuel into the afterburner 30. Propulsion thrust is therefore provided solely by the normal discharge of core exhaust 28 and fan bypass air 26 from the turbofan engine and out the non-operating afterburner. The inner nozzle 36 provides optimum performance of the engine in this mode of operation.

The turbofan engine 10 may then be operated in its wet or reheat mode of operation to inject additional fuel into the afterburner 30 which undergoes combustion therein for producing additional propulsion thrust for supersonic operation of the intended aircraft. The combustion process inside the afterburner 30 in turn ignites and burns the combustible inner nozzle 36 which is then ablated or consumed away. The larger fixed area outer nozzle 34 is then revealed and has sufficient discharge area for the additional exhaust flow and additional thrust provided thereby.

Ablation of the inner nozzle 36 may occur in the order of a few seconds upon initiation of afterburner operation. The corresponding slew rate of fuel introduced into the injector and spray bars in the afterburner may be suitably controlled to match the quick consumption rate of the inner nozzle 36 and prevent performance degradation of the turbofan engine itself.

The inner nozzle 36 may be formed of various ablative materials depending upon the specific mission and duration of the intended aircraft, including cruise missiles, drones, or other applications, both military and commercial. If the dry, non-augmented operation of the engine is intended to be relatively long, the ablative material of the inner nozzle 36 may be specifically configured therefor, or may include a suitable protective coating or liner for preventing erosion thereof until afterburner operation is initiated.

For multiple, but limited reuse of the augmented turbofan engine, the engine may be suitably recovered and reconditioned to replace the spent inner nozzle 36 with additional material suitably formed or molded in place.

Unlike a typical high performance military aircraft having an articulated, variable area exhaust nozzle for repeatedly transitioning between subsonic and supersonic flight operation, the engine illustrated in FIG. 1 is configured for a single mission, and a single transition to supersonic operation. Subsonic operation of the engine following ablation of the inner nozzle 36 would greatly be degraded in view of the substantially larger outer nozzle 34 configured for supersonic operation, but is not relevant for singe mission use.

Nevertheless, the augmented engine illustrated in FIG. 1 is relatively simple in construction, has few parts in the afterburner, with the afterburner including no moving parts in the exhaust nozzle thereof. The engine may be efficiently operated from dry to reheat operation to achieve supersonic flight velocities in a single flight mission.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A gas turbine engine afterburner comprising:
an exhaust duct having a fixed area outer nozzle at an aft end thereof;
an ablative inner nozzle lining said outer nozzle;
a flameholder mounted inside a forward end of said duct; and
a fuel injector disposed in said flameholder for injecting fuel therein.

2. An afterburner according to claim 1 wherein said flameholder comprises a plurality of flameholding gutters extending radially outwardly from a center cup to a surrounding liner.

3. An afterburner according to claim 2 wherein said liner terminates upstream from said outer nozzle to define a combustion chamber extending inside said liner and downstream therefrom inside said exhaust duct to define a linerless portion thereof.

4. An afterburner according to claim 3 wherein said linerless duct portion is coated inside with a thermal barrier coating.

5. An afterburner according to claim 4 wherein:
said outer nozzle has an axial contour converging aft to an outer throat of minimum flow area and diverging aft to a nozzle outlet at an aft end of said outer nozzle; and
said inner nozzle has an axial contour converging aft to an inner throat smaller than said outlet throat and diverging aft to said nozzle outlet.

6. An afterburner according to claim 5 wherein said flameholder liner includes a pattern of screech suppression holes therein.

7. An afterburner according to claim 6 wherein said flameholder liner is spaced inwardly from said duct to define a slot for channeling cooling air therethrough for cooling said liner and film cooling said linerless duct portion downstream therefrom.

8. An afterburner according to claim 7 wherein said center cup includes a center aperture receiving said fuel injector therein, and a plurality of surrounding slots for swirling engine exhaust therethrough.

9. An afterburner according to claim 8 further comprising a plurality of fuel injection spray bars distributed between said flameholder gutters.

10. An afterburner according to claim wherein said ablative inner nozzle comprises a combustible material.

11. For a gas turbine engine including a compressor, combustor, and turbine, an afterburner comprising:
a gas turbine engine exhaust duct having an inlet at a forward end thereof for receiving exhaust flow from said turbine, and having a fixed area outer nozzle at an aft end thereof; and
an ablative inner nozzle lining said outer nozzle.

12. An afterburner according to claim 11 wherein:
said outer nozzle has an axial contour converging aft to an outer throat of minimum flow area and diverging aft to a nozzle outlet at an aft end of said outer nozzle; and
said inner nozzle has an axial contour converging aft to an inner throat smaller than said outlet throat and diverging aft to said nozzle outlet.

13. An afterburner according to claim 12 wherein said ablative inner nozzle comprises a combustible material.

14. An afterburner comprising:
an exhaust duct having a fixed area outer nozzle at an aft end thereof;
an ablative inner nozzle lining said outer nozzle;
said outer nozzle having an axial contour converging aft to an outer throat of minimum flow area and diverging aft to a nozzle outlet at an aft end of said outer nozzle;
said inner nozzle having an axial contour converging aft to an inner throat smaller than said outlet throat and diverging aft to said nozzle outlet;
a flameholder mounted inside a forward end of said duct; and
a fuel injector disposed in said flameholder for injecting fuel therein.

15. An afterburner according to claim 14 wherein said flameholder comprises a plurality of flameholding gutters extending radially outwardly from a center cup to a surrounding liner.

16. An afterburner according to claim 15 wherein said liner terminates upstream from said outer nozzle to define a combustion chamber extending in minor part inside said liner and in major part downstream therefrom inside said exhaust duct to define a linerless portion thereof.

17. An afterburner according to claim 16 wherein said linerless duct portion is coated inside with a thermal barrier coating.

18. An afterburner according to claim 16 wherein said flameholder liner includes a pattern of screech suppression holes therein.

19. An afterburner according to claim 18 wherein said flameholder liner is spaced inwardly from said duct to define a slot for channeling cooling air therethrough for cooling said liner and film cooling said linerless duct portion downstream therefrom.

20. An afterburner according to claim 16 wherein said gutters are integrally formed with said center cup and surrounding liner in a unitary component.

21. An afterburner according to claim 16 wherein said center cup includes a center aperture receiving said fuel injector therein, and a plurality of surrounding slots for swirling engine exhaust therethrough.

22. An afterburner according to claim 21 further comprising a plurality of fuel injection spray bars distributed between said flameholder gutters.

23. An afterburner according to claim 16 in combination with a turbofan gas turbine engine having an outlet aligned with said flameholder for discharging core exhaust thereto, and a surrounding fan bypass duct aligned with said flameholder liner for discharging fan bypass air therearound.

24. An apparatus according to claim 23 wherein:
said engine includes a compressor for pressurizing air, and a controller operatively joined to said fuel injector in said afterburner; and
said controller is configured to schedule fuel flow to said afterburner to match rate of ablation of said inner nozzle upon initiation of afterburner operation to maintain stall margin of said compressor.

25. A method of operating said gas turbine engine and afterburner according to claim 23 comprising:
operating said engine in a dry mode to produce exhaust thrust through said inner nozzle without injecting fuel into said afterburner; and
operating said engine in a wet mode to inject additional fuel into said afterburner for undergoing combustion therein and ablating said inner nozzle to reveal said outer nozzle for producing additional exhaust thrust therethrough.

* * * * *